United States Patent [19]

Krafcik

[11] Patent Number: 5,780,975
[45] Date of Patent: Jul. 14, 1998

[54] LOW COST INVERTER WITH BOTH DISCRETE AND INTEGRATED POWER SWITCHES

[75] Inventor: Robert J. Krafcik, Phoenix, Ariz.

[73] Assignee: Duiel Corporation, Chandlen, Ariz.

[21] Appl. No.: 731,063

[22] Filed: Oct. 9, 1996

[51] Int. Cl.$^6$ .............................. G09G 3/12; G09G 19/32
[52] U.S. Cl. ...................... 315/169.3; 363/132; 345/102; 368/67
[58] Field of Search .............................. 327/419, 423, 327/424, 413, 482, 110, 118; 315/169.3; 368/67, 227; 345/102; 257/98, 275, 72, 500; 363/134, 131, 132, 133

[56] References Cited

U.S. PATENT DOCUMENTS

| | | | |
|---|---|---|---|
| 5,256,582 | 10/1993 | Mosher et al. | 437/31 |
| 5,313,141 | 5/1994 | Kimball | 315/169.3 |
| 5,483,503 | 1/1996 | Kimball | 368/67 |
| 5,525,869 | 6/1996 | Wood | 315/169.3 |
| 5,539,707 | 7/1996 | Wood | 368/67 |

*Primary Examiner*—Arnold Kinkead
*Attorney, Agent, or Firm*—Paul F. Wille

[57] ABSTRACT

An inverter for powering an electroluminescent lamp includes a supply terminal, a ground terminal, a first switching transistor, an inductor, and a second switcing transistor connected in series between the supply terminal and the ground terminal. As implemented in a semiconductor device, one of the switching transistors in a discrete device and the other of the switching transistors is included in the same die as the driving circuit for the switching transistors. The sum of die cost, packaging cost, and external device cost is a minimum for a single, external power transistor.

4 Claims, 2 Drawing Sheets

LOW COST INVERTER WITH BOTH DISCRETE AND INTEGRATED POWER SWITCHES

BACKGROUND

This invention relates to inverters for electroluminescent (EL) lamps and, in particular, to an implementation of an inverter that minimizes costs.

An EL lamp is essentially a capacitor having a dielectric layer including a phosphor powder that glows in the presence of a strong electric field and a very low current. The dielectric layer is held between two electrodes, one of which is transparent. Because the EL lamp has many of the characteristics of a capacitor, an alternating current (AC) must be applied to cause the phosphor to glow. Otherwise, the lamp charges to the applied voltage and light emission ceases.

For wristwatches and other applications such as pocket pagers, an EL lamp is driven by an inverter that converts the direct current from a small battery into alternating current. The battery voltage, typically one to three volts, limits the voltage that can be applied to a lamp by the inverter. In order for the EL lamp to glow sufficiently, a peak-to-peak voltage in excess of one hundred and twenty volts is necessary. Converting from three volts to one hundred and twenty volts is difficult without a transformer and a transformer is too bulky and expensive for a wristwatch and for many other applications.

To increase the voltage across an EL lamp, it is known in the art to convert low voltage direct current to high voltage alternating current using a pump circuit in which energy is stored in an inductor. An inductor and switch transistor are connected in series across a battery. When the transistor shuts off, the collapsing field in the inductor generates a high voltage pulse. A series of such pulses charges the lamp and the lamp glows. One such circuit is disclosed in U.S. Pat. No. 5,141,131 (Kimball) in which the inductor is connected between a pair of switching transistors across the battery. The switching transistors are alternately pulsed to provide alternating current through an EL lamp from a single output terminal.

The Kimball circuit is commercially successful and modifications of the circuit have been proposed for implementing the circuit as an integrated circuit (IC). For example, U.S. Pat. No. 5,525,869 (Wood) discloses a circuit that re-uses some drive current to improve the efficiency of a drive circuit. U.S. Pat. No. 5,539,707 (wood) discloses implementing a digital driver and time-keeping functions in a first integrated circuit and the switching transistors in a second integrated circuit.

It is known in the art to implement an inverter on two or more semiconductor die. For example, U.S. Pat. No. 5,483,503 (Kimball) discloses optimizing space in a die by separating high voltage functions from low voltage functions. The die can be made by different processes based upon design libraries that optimize the layout of each die.

In the particular application of an inverter for watches or other portable electronic devices, cost is a constant problem. An EL lamp is highly desirable because of its uniformity of luminance, low power consumption, and other properties. Although it is known to use an inverter to power a buzzer or other device in addition to an EL lamp, an inverter typically has no other use than to power the EL lamp in a portable electronic device. Thus, the cost of the inverter is, in effect, a significant burden on the cost of an EL lamp.

In view of the foregoing, it is therefore an object of the invention to reduce the cost of an inverter for EL lamps.

Another object of the invention is to provide an inverter having a single ended output implemented in two semiconductor devices at minimal total cost.

A further object of the invention is to provide a low cost inverter having series connected switching transistors wherein one of the switching transistors is a discrete device and the other of the switching transistors is incorporated into an integrated circuit.

SUMMARY OF THE INVENTION

The foregoing objects are achieved in the invention in which an inverter for powering an electroluminescent lamp includes a supply terminal, a ground terminal, a first switching transistor, an inductor, and a second switching transistor connected in series between the supply terminal and the ground terminal. As implemented in a semiconductor device, one of the switching transistors in a discrete device and the other of the switching transistors is included in the same die as the driving circuit for the switching transistors. The sum of die cost, packaging cost, and external device cost is a minimum for a single, external power transistor.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
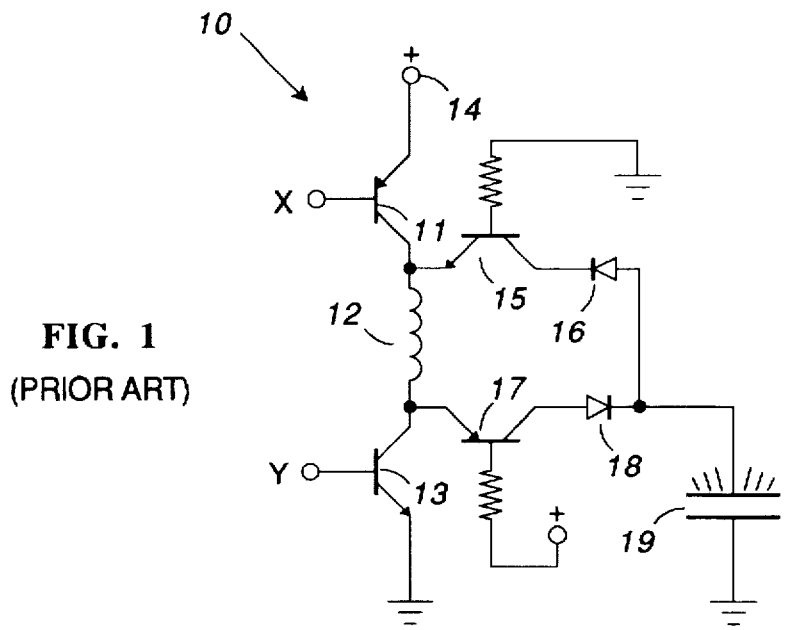
FIG. 1 is a schematic diagram of the pump portion of an inverter including two, series connected, switching transistors.

FIG. 1 is based upon the disclosure of U.S. Pat. No. 5,313,117 (Kimball). Inverter 10 includes transistor 11, inductor 12, and transistor 13 connected in series between voltage source 14 and ground. Inductor 12 is alternately connected through transistors 15 and 17 to lamp 19. Diode 16 is connected in a series with transistor 15 for preventing the transistor from operating in the inverse active mode, i.e. preventing transistor 15 from conducting current from the ground terminal through the forward bias based-collector junction when the voltage on lamp 19 is negative. Similarly, diode 18 prevents transistor 17 from operating in the inverse active mode when the voltage on lamp 19 is positive and greater than the battery voltage.

Logic circuitry (not shown in FIG. 1) provides a series of high frequency pulses that are alternately applied to input lines "X" and "Y". The logic circuitry and the resistors, diodes, and low power transistors shown in FIG. 1 are implemented in an integrated circuit available from Durel Corporation as device type D310. The switching transistors, inductor, and capacitors are external devices coupled to the integrated circuit on a printed circuit board.

Figure 2:
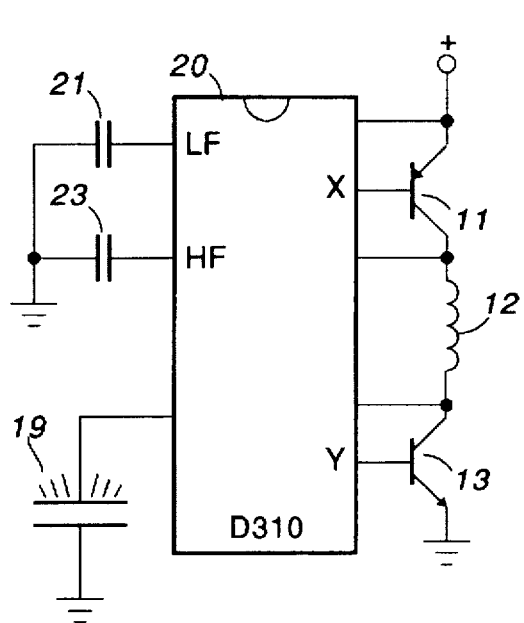
FIG. 2 is a partial schematic diagram of an inverter partially implemented in an IC.

FIG. 2 illustrates the salient connections to integrated circuit 20. Timing capacitor 21 is part of an RC oscillator producing low frequency pulses and timing capacitor 23 is part of an RC oscillator producing high frequency pulses.

While high frequency pulses are applied to input "Y", transistor 11 remains conductive. The high frequency pulses turn transistor 13 on and off to pump up the voltage across lamp 19.

At the end of the half cycle, lamp 19 is discharged and then high frequency pulses are applied to input "X" while transistor 13 remains conductive. The high frequency pulses turn transistor 11 on and off to increase the voltage across lamp 19. At the end of the half cycle, lamp 19 is discharged. The high frequency pulses alternate between inputs "X" and "Y" at low frequency, producing a low frequency, alternating current through lamp 19.

Figure 3:
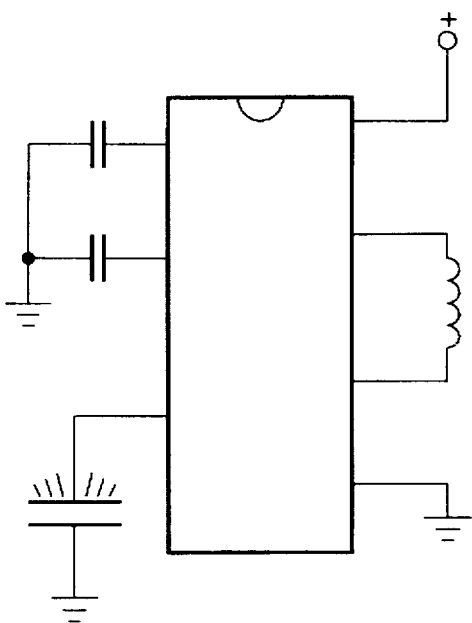
FIG. 3 is partial schematic diagram of an inverter implemented entirely in a single IC.

In the prior art, an inverter typically includes an integrated circuit connected to separate, external switching transistors, as illustrated in FIG. 2. It is also known in the art to include the switching transistors on an integrated circuit, as illustrated in FIG. 3. The rationale behind the former is to eliminate high power devices from the IC, thereby reducing the size of the die. For watches and many other portable electronic devices, the smaller die size seemed an advantage, particularly because many processes for fabricating semiconductor devices are better suited for either high voltage devices or low voltage devices, but not both. The rationale behind putting all semiconductor devices in one IC is to simplify manufacturing by reducing component count.

Although these ideas are widely accepted and reasonable, it has been discovered that the lowest cost is not obtained from either approach. More specifically, it has been discovered that having a single external switching transistor is the most economical combination. Although it would seem that one is combining the disadvantages of both of the known approaches for implementing an inverter, and obtaining none of the advantages, it turns out that this is not the case.

Figure 4:
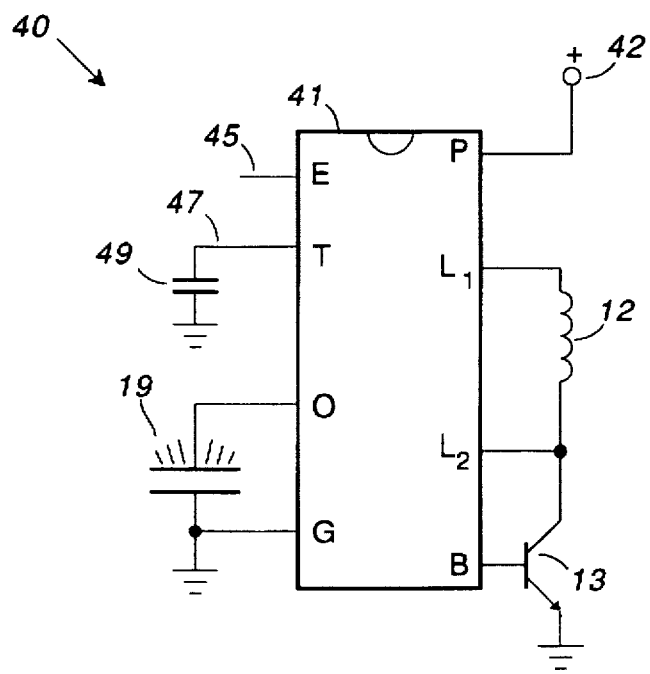
FIG. 4 is a partial schematic of an inverter constructed in accordance with a preferred embodiment of the invention.

FIG. 4 illustrates a preferred embodiment of the invention in which an inverter included series connected switching transistors is implemented as an IC coupled to a single external, switching transistor. Inverter 40 operates as described in conjunction with FIGS. 1 and 2. IC 41 has one pin (P) coupled to power source 42 and another pin (G) coupled to ground. Separate pins (L1 and L2) are provided for the inductor and a pin (B) is needed for coupling signals to the base of external transistor 13. Lamp 19 is coupled to the output pin (O) and IC 41 produces an alternating voltage for lamp 19 when an enabling signal is coupled via line 45 to pin (E). The eighth pin (T) is a timing input and can be coupled to timing capacitor 49 or to a source of timing pulses (not shown), such as from a clock/calendar circuit. Thus, a single IC having as few as eight pins can be used to implement a fully functional inverter employing series connected switching transistors.

Figure 5:
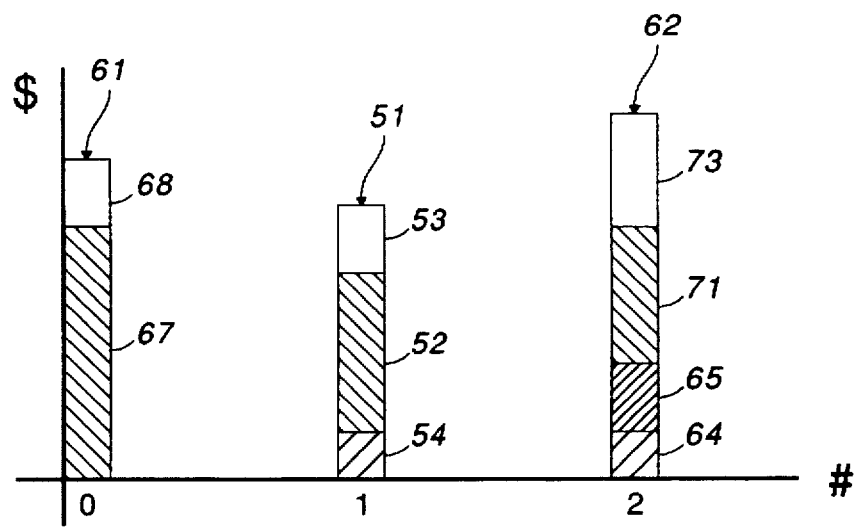
FIG. 5 is a histogram useful in describing the advantages of the invention.

There are several costs associated with an inverter and FIG. 5 illustrates these costs for an inverter having zero external switching transistors, one external switching transistor, and two external switching transistors. In column 51, area 52 represents the cost of a semiconductor die containing the integrated circuit portion of the inverter. Area 53 represents the cost of packaging the die and area 54 represents the cost of a single, discrete, switching transistor. In column 61, there are no external switching transistors and the cost is zero. In column 62, there are two external, switching transistors and the cost thereof is represented by areas 64 and 65. Area 65 is larger than area 64 because the cost of a PNP transistor is typically higher than the cost of an NPN transistor.

In column 61, the die cost, represented by area 67, is greater than the die cost for the other implementations of an inverter. Packaging costs, represented by area 68, are low because packaging costs are approximately proportional to the number of leads and the IC represented in column 61 can be implemented in an eight-pin package.

The cost of a die having no power transistors, represented by area 71, is the lowest of the group. The cost of a die represented by area 52 is intermediate in size between areas 67 and 71. Packaging costs, represented by area 73, are larger for a low voltage IC because more pins are required to connect to the external transistors. Thus, the costs for various aspects of implementing the inverter vary but, contrary to expectations, the total cost is a minimum with a single, external, switching transistor.

The invention thus enables one to reduce the overhead associated with EL lamps by reducing the cost of the required inverter. The inverter is implemented in two separate semiconductor devices at minimal total cost. The inverter includes series connected switching transistors for improved performance and efficiency and provides a highly desirable single ended output.

Having thus described the invention, it will be apparent to those of skill in the art that various modifications can be made within the scope of the invention. For example, the invention can be applied to other types of inverters having series connected power transistors driven by low voltage transistors in a driver circuit. The external transistor can be NPN or PNP, although NPN is preferred for bipolar switching transistors. Field effect devices, e.g. MOSFETs and JFETs, can be used instead of bipolar devices.

What is claimed as the invention is:

1. An inverter for converting a low voltage direct current into a high voltage alternating current, said inverter comprising:
   a supply terminal;
   a ground terminal;
   an inductor having a first terminal and a second terminal;
   a first switching device coupled between said supply terminal and the first terminal of said inductor;
   a second switching device coupled between the second terminal of said inductor and ground;
   a driver circuit for controlling the first switching device and the second switching device;
   wherein said second switching device is a discrete semiconductor device and said first switching device is implemented in the same semiconductor device as said driver circuit.

2. The inverter as set forth in claim 1 wherein said inverter includes an output terminal and said driver circuit alternately turns on said first switching transistor while pulsing said second switching transistor and then turns on said second switching transistor while pulsing said first switching transistor to produce an alternating current at said output terminal.

3. A portable electronic device comprising:
   a display;
   an electroluminescent lamp for backlighting said display;
   a source of low voltage, direct current;
   an inverter for powering said electroluminescent lamp from said source, said inverter including:
   (i) a supply terminal,
   (ii) a ground terminal;
   (iii) an inductor;
   (iv) a first switching device coupled between said supply terminal and said inductor;

(v) a second switching device coupled between said inductor and ground; and
(vi) a timing circuit for controlling the first switching device and the second switching device;

wherein said second switching device is a discrete semiconductor device and said first switching device is implemented in the same integrated circuit as said timing circuit.

4. The portable electronic device as set forth in claim 3 wherein said timing circuit alternately turns on said first switching transistor while pulsing said second switching transistor and then turns on said second switching transistor while pulsing said first switching transistor to produce an alternating current through said electroluminescent lamp.

* * * * *